(12) United States Patent
Lee et al.

(10) Patent No.: US 7,875,667 B2
(45) Date of Patent: *Jan. 25, 2011

(54) LONG-FIBER REINFORCED POLYOLEFIN COMPOSITION

(75) Inventors: Jae-Shik Lee, Cheonan (KR); Ju-Hong Kim, Chungju (KR)

(73) Assignee: Sambark LFT Co., Ltd., Asan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/651,833

(22) Filed: Jan. 4, 2010

(65) Prior Publication Data

US 2010/0120963 A1    May 13, 2010

Related U.S. Application Data

(63) Continuation of application No. 11/630,570, filed as application No. PCT/KR2005/002210 on Jul. 8, 2005, now Pat. No. 7,678,854.

(30) Foreign Application Priority Data

Jul. 8, 2004    (KR) .................. 10-2004-0053174

(51) Int. Cl.
C08K 3/18    (2006.01)
C08K 3/04    (2006.01)

(52) U.S. Cl. ..................... 524/431; 524/495

(58) Field of Classification Search .............. 524/431
See application file for complete search history.

(56) References Cited

U.S. PATENT DOCUMENTS 5,213,889 A    5/1993    Cogswell et al.

FOREIGN PATENT DOCUMENTS

| EP | 0 812 882 A | 12/1997 |
| EP | 812882 A1 * | 12/1997 |
| JP | 1-241406 A | 9/1989 |
| JP | 3-114705 A | 5/1991 |
| JP | 07-216135 A | 8/1995 |
| JP | 09-183869 A | 7/1997 |
| JP | 11-255987 A | 9/1999 |
| JP | 2001-172399 A | 6/2001 |
| JP | 2001-342305 A | 12/2001 |
| KR | 2001-0051300 A | 6/2001 |

* cited by examiner

Primary Examiner—Ling-Siu Choi
Assistant Examiner—Hui Chin
(74) Attorney, Agent, or Firm—Birch, Stewart, Kolasch & Birch, LLP (57) ABSTRACT

Disclosed are a long-fiber reinforced and colored molded article having desirable physical properties such as superior impact strength, tensile strength, and flexural strength as well as superior heat-resistance, a long-fiber reinforced polyolefin composition for producing the article, and method for producing the article. The long-fiber reinforced polyolefin composition comprises long-fiber reinforced polyolefin pellets including 35 to 90 weight % of a long-fiber reinforcing agent and 5 to 60 weight % of polyolefin wherein the impregnation degree of the long-fiber reinforced polyolefin pellet is preferably more than 80%; and colored polyolefin pellets having the length of 5 to 500 mm, and including 0.01 to 15 weight % of a coloring agent for the total amount of the coloring agent and polyolefin, wherein the amount of the colored polyolefin pellets is 5 to 80 weight % for the total amount of the colored polyolefin pellets and the long-fiber reinforced polyolefin pellets.

11 Claims, 1 Drawing Sheet

Figure 1

LONG-FIBER REINFORCED POLYOLEFIN COMPOSITION

This application is a continuation application of application Ser. No. 11/630,570 filed Dec. 22, 2006 now U.S. Pat. No. 7,678,854. Application Ser. No. 11/630,570 is a 371 national phase application of PCT/KR2005/002210, filed Jul. 8, 2005. PCT/KR2005/002210 claims priority to Application No. 10-2004-0053174, which was filed in the Republic of Korea on Jul. 8, 2004. The contents of the above-described applications are herein incorporated by reference in their entirety.

TECHNICAL FIELD

The present invention relates to a long-fiber reinforced polyolefin composition, and more particularly to a long-fiber reinforced and colored molded article having desirable physical properties such as superior impact strength, tensile strength, and flexural strength as well as superior heat-resistance, a long-fiber reinforced polyolefin composition for producing the article, and method for producing the article.

BACKGROUND ART

Polyolefins are general purpose plastics having superior chemical resistance and formability (processability), but are not suitable for preparing articles which require the high heat-resistance and superior physical properties due to their inferior heat-resistance and physical properties. To make up for the weak points of polyolefin, polyolefin has been conventionally reinforced with various organic or inorganic materials. For example, the mechanical strength and heat resistance of polyolefin can be improved by mixing polyolefin and glass fibers with a kneader such as an extruder. However, most of the glass fibers are damaged by the screw of the extruder during the mixing step, and the damaged short glass fibers are mixed with polyolefin. Therefore, the glass fibers are not satisfactory for improving the mechanical strength of polyolefin, and there is other disadvantage that the stirring of the mixture of polyolefin and the glass fibers is difficult when the amount of the glass fibers is more than 30 weight %.

In the automobile industry and electronics industry, there is an increasing demand for polyolefin having high impact strength, but the short fiber reinforced polyolefin cannot meet such demands. In order to prepare a long-fiber reinforced polyolefin, filament fibers were disentangled from a bundle of non-polyolefin filament fibers, or from a mixed bundle of polyolefin filament fibers and non-polyolefin filament fibers, and modified or normal polyolefin was impregnated, coated, and/or adhered to the disentangled filament fibers. For example, the conventional long-fiber reinforced polyolefin was prepared by continuously coating minute filament fibers with polyolefin, and the coating step was carried out (1) by simply heating filament fibers while adhering the powdered suspension of modified or normal polyolefin to the filament fibers, (2) by impregnating or contacting filament fibers to a heat melted polyolefin, (3) by adhering modified or normal polyolefin powder to the charged filament fibers, and then heating the polyolefin powder, or (4) by impregnating filament fibers to a solvent-dissolved modified or normal polyolefin, and then removing the solvent. The molded articles produced with the conventional long-fiber reinforced polyolefin have superior mechanical strength, and particularly, have impact strength which is more than three times higher than that of normal polyolefin. The filament fibers are oriented in the same direction in polyolefin, and can be densely filled (90 weight % at maximum) in polyolefin.

The fiber reinforced polyolefin of high density can be used as a master batch for producing the molded articles. As the method for preparing the molded articles by using the fiber reinforced polyolefin as a master batch, the following methods are known in the prior arts. U.S. Pat. No. 5,213,889 disclosed a method of producing molded articles with more than 30 weight % of the long-fiber reinforced thermoplastics which includes more than 50 weight % of the filament fibers in the thermoplastics. Japanese Laid-open patent No. H1-241406 disclosed a molding method which mixes in dry state a long-fiber reinforced thermoplastic and a thermoplastic without the long-fibers. Japanese Laid-open patent No. H3-114705 disclosed a method of preparing long-fiber reinforced polyolefin by using polyolefin having a melt flow rate of 20 to 60 g/10 min. Japanese Laid-open patent No. S59-20339 disclosed a method of heating the mixture of glass filament fiber and modified polyolefin fiber. Korean Patent No. 93-336304 disclosed a method of preparing long-fiber reinforced polyolefin having the glass fiber content of 60 to 90 weight % by using polyolefin of a melt flow rate of 70 to 300 g/10 min, wherein the long-fiber reinforced polyolefin is used as a master batch for preparing the molded articles.

Meanwhile, in order to give coloring to the fiber reinforced polyolefin, a colored polyolefin pellet including condensed dye or pigment is conventionally used. The length of the conventional colored pellets is less than 3 mm, the amount of dye or pigment in the pellet is more than 30 weight %, and the pellets are used in the amount of less than 3 weight %. However, it seems that the drawbacks, which occur when using such small amount of the colored polyolefin pellets which include concentrated dye or pigment, were not seriously considered by the skilled person in the arts. For example, the physical properties of the molded article are seriously deteriorated when the colored polyolefin pellets are mixed with the long-fiber reinforced polyolefin, but such drawback has not been expressly pointed out by the skilled person in the arts. The present inventor found that even small amount of the colored polyolefin pellets would seriously deteriorate the physical properties of the long-fiber reinforced polyolefin, and it seems that the deterioration of mechanical properties of the final molded article was caused by the dye or pigment which deteriorates the compatibility between the long-fibers and the plastic resins at their contacting surfaces. To prevent the deterioration of the mechanical properties due to the dye or pigment, Korean Laid-open Patent No. 10-2000-0063675 disclosed a method of adding one or more polyamide into the colored and long-fiber reinforced articles. However, polyamide is much more expensive than polyolefin, which results in the increase of the production cost of the final molded article. In addition, there is other problem that polyamide is difficult to be blended with polyolefin due to its low compatibility with polyolefin.

DISCLOSURE

Technical Problem

Therefore, it is an object of the present invention to provide a colored and long-fiber reinforced molded article which has superior mechanical properties and heat resistance.

It is other object of the present invention to provide a colored and long-fiber reinforced molded article which has uniform mechanical properties and low quality deviation.

It is another object of the present invention to provide a colored and long-fiber reinforced molded article which is less expensive.

It is yet another object of the present invention to provide a long-fiber reinforced polyolefin composition for producing the colored and long-fiber reinforced molded article, and a method for producing the molded article.

Technical Solution

To achieve these and other objects, the present invention provides a long-fiber reinforced polyolefin composition, which comprises long-fiber reinforced polyolefin pellets including 35 to 90 weight % of a long-fiber reinforcing agent and 5 to 60 weight % of polyolefin, wherein the impregnation degree of the long-fiber reinforced polyolefin pellet is more than 80%; and colored polyolefin pellets having the length of 5 to 500 mm, and including 0.01 to 15 weight % of a coloring agent for the total amount of the coloring agent and polyolefin, wherein the amount of the colored polyolefin pellets is 5 to 80 weight % for the total amount of the colored polyolefin pellets and the long-fiber reinforced polyolefin pellets. The present invention also provides a method for producing a long-fiber reinforced polyolefin molded article, which comprises the steps of: mixing the colored polyolefin pellets and the long-fiber reinforced polyolefin pellets, wherein the amount of the colored polyolefin pellets is 5 to 80 weight % for the total amount of the colored polyolefin pellets and the long-fiber reinforced polyolefin pellets; and molding the mixed pellets. The present invention further provides a long-fiber reinforced molded article which is produced by the above-mentioned method.

DESCRIPTION OF DRAWINGS

A more complete appreciation of the invention, and many of the attendant advantages thereof, will be better understood by reference to the following detailed description when considered in conjunction with the accompanying drawing, wherein.

MODE FOR INVENTION

In the prior arts, the properties of a long-fiber reinforced polyolefin composition were generally controlled by changing the amount of long-fiber in the polyolefin composition and by changing the physical properties of the polyolefin. However, when coloring agents are added to the polyolefin composition, the physical properties of the polyolefin master batch, which is impregnated with the long-fiber, are seriously deteriorated. Even though it is not recognized in the prior arts that the deterioration of the physical properties is due to the small amounts of the coloring agents, such as dye or pigment, methods for improving the physical properties of the polyolefin composition by adding various additives are tried in the prior arts. However, from a number of tests, the present inventors have found that the mechanical properties, the property deviations or distributions, and the uniformity of the properties of the colored and long-fiber reinforced polyolefin molded article are seriously deteriorated when the molded article is prepared by mixing the long-fiber reinforced polyolefin pellets and the conventional colored polyolefin pellets including the concentrated dye or pigment. The length of the conventional colored polyolefin pellet is less than 3 mm, the amount of dye or pigment therein is more than 30 weight %, and the conventional colored polyolefin pellet are used in the amount of less than 3 weight % on the basis of the total amount of the colored polyolefin pellets and the long-fiber reinforced polyolefin pellets. Therefore, the conventional colored and long-fiber reinforced polyolefin molded article is not satisfactory for use in the automobile industry or the electronics industry requiring superior physical properties. However, as previously mentioned, the causes of the property deterioration in the molded article of the colored and long-fiber reinforced composition have not been researched and systematically analyzed. The present inventors have tried to find out the cause of the property deterioration by performing a number of tests for a long time. As a result, the present inventors have found a method of maintaining the properties of the colored and long-fiber reinforced polyolefin composition without adding extra additives which are expensive and generally incompatible with the colored polyolefin pellets and the long-fiber reinforced polyolefin pellets, which is disclosed in Korean Laid-open Patent No. 10-2000-0063675.

Hereinafter, the causes of the property deterioration in the colored polyolefin molded article will be explained. As the primary cause, the property deterioration is caused by the excessive heat, which is generated due to the friction of the filament fibers during a plasticization step of the molding process of the long-fiber reinforced polyolefin composition. In detail, compared with the ordinary reinforcement fiber having the length of 3 mm, the long-fiber for reinforcement has the length of 5 to 500 mm, and the long filament fibers for reinforcement are aligned in the same direction and have same length in the molded article. Therefore, during processing, such as injection molding, extrusion compression molding, compression molding, low pressure injection molding, gas assisted injection molding, and foam injection molding, the reinforced composition is overheated by friction between the adjacent long-filament fibers or by friction between the long-filament fibers and metal of the processing machine. As the secondary cause, the excessive heat produced by the frictions induces various instabilities, such as instability of the concentrated pigment or dye itself, instability of additive materials for dispersing the pigment or dye, instability of filament fiber and resin at their interface, and instability of bonding power between the melted resin and filament fiber at their interface. As the third cause, the instabilities due to the friction heat are amplified as the processing time passes, and seriously deteriorate the physical properties of the molded article if the processing is not carried out under very uniform condition or under the very diluted concentrations of the pigment or dye especially when the polyolefin pellets of a long length are mixed. Thus the present invention can provide the following new and developed solution that is not disclosed in the prior arts by elucidating the causes inducing the deterioration of the physical properties.

Figure 1:
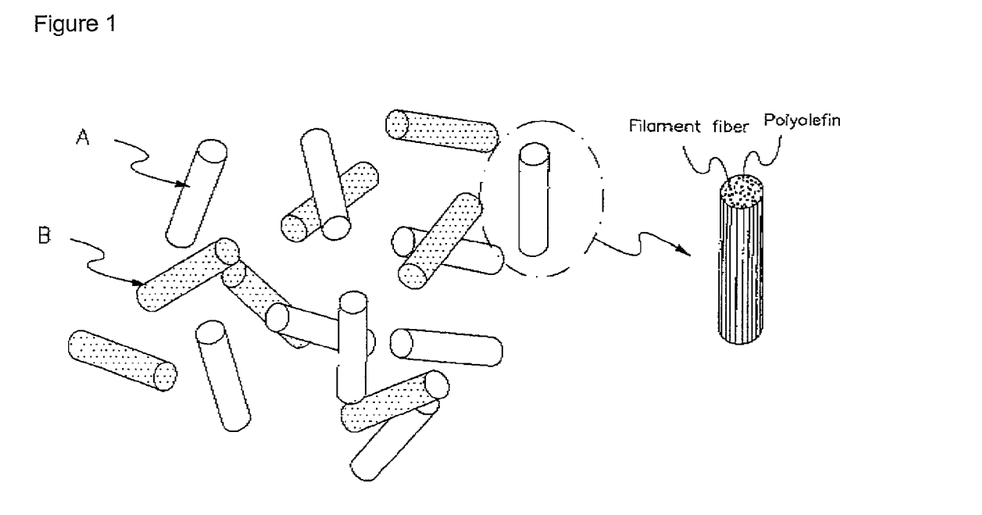
FIG. 1 is a drawing for illustrating the long-fiber reinforced polyolefin composition according to the present invention including long-fiber reinforced polyolefin pellets (A) and colored polyolefin pellets (B).

As shown in FIG. 1, the long-fiber reinforced polyolefin composition according to the present invention includes long-fiber reinforced polyolefin pellets (A) and colored polyolefin pellets (B). The long-fiber reinforced polyolefin pellet (A) includes 35 to 90 weight % of a long-fiber reinforcing agent, 5 to 60 weight % of polyolefin, and optionally 0.001 to 5 weight %, preferably 0.01 to 5 weight % of conventional additive, wherein the impregnation degree of the long-fiber reinforced polyolefin pellet is preferably more than 80%. When the amount of the long-fiber reinforcing agent is less than 35 weight % or the amount of polyolefin is more than 60 weight %, the physical properties of the molded article may not be sufficiently improved due to the low amount of the long-fiber. When the amount of the long-fiber reinforcing agent is more than 90 weight % or the amount of polyolefin is less than 5 weight %, the long-fiber reinforcing agent may not be sufficiently impregnated with polyolefin, which results in the deterioration of the external appearance of the molded article. The present inventors have found that the excessive heat generation due to the friction of the long-fibers can be effectively prevented by uniformly coating the long-fibers with polyolefin in the pellet. As previously described, the excessive heat is generated by friction between the adjacent long-filament fibers or by friction between the long-filament fibers and metal of the processing machine. The amount and the impregnation degree of the long-fiber reinforcing agent in the long-fiber reinforced polyolefin pellet (A) are controlled to meet the above-mentioned requirement. In other words, in the present invention, the impregnation degree of the long-fiber reinforcing agent in the long-fiber reinforced polyolefin pellet (A) is increased to more than 80% to prevent the deteriorations of quality and physical properties of the molded article.

Polyolefin useful for preparing the long-fiber reinforced polyolefin pellet can be selected according to the function and usage of the final molded article, and may include ethylene homopolymer, propylene homopolymer, ethylene-propylene block copolymer, ethylene-propylene random copolymer, propylene α-olefin copolymer, α-olefin homopolymer or copolymer, and the mixtures thereof. The α-olefin can be selected from the group consisting of 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, 1-dodecene, and mixtures thereof, and preferably can be selected from 1-butene, 1-pentene, 1-hexene, and 1-octene. The polyolefin can be a modified polyolefin resin, and, if necessary, can include one or more modified polyolefin. The modified polyolefin can also be selected according to the function and usage of the final molded article. For example, polyolefin can be partially or totally modified with polar functional groups which have a desirable affinity with glass fiber, and exemplary polar functional group includes unsaturated carboxylic acid or its derivatives.

The preferable long-fiber reinforcing agent useful for preparing the long-fiber reinforced polyolefin pellet is a filament fiber having a diameter of less than 100 micrometer and a length of 6 to 500 mm, preferably 6 to 300 mm. The filament fiber can be polyolefin filament fiber, non-polyolefin filament fiber, or the mixture thereof, and can also be selected according to the function and usage of the final molded article. Considering the price or efficiency, the preferable filament fiber can be selected from the group consisting of glass filament fiber, carbon filament fiber, graphite filament fiber, metal filament fiber, aramid fiber filament, polyethylene filament fiber, polyacrylonitrile filament fiber, arylate filament fiber, PEEK (Polyether ether ketone) filament fiber, and the mixtures thereof. If natural fiber is used as the long-fiber reinforcing agent, it is environmentally preferable.

The conventional additive, which can be optionally used for preparing the long-fiber reinforced polyolefin pellet, is to increase the processability and the functionality of the pellets. The additive is used under the condition that the compatibility of polyolefin and long-fiber reinforcing agent is not deteriorated by the additive. Examples of the additive include conventional dispersant, coating agent for inorganic material, interface binding agent for organic material and inorganic material, cross-linking agent, heat stabilizers, anti-oxidation agent, stabilizer for preventing hydrolysis, various peroxide chemicals, lubricant, interface binding agent, UV-ray stabilizer, light stabilizer, slip agent, release agent, impact resistant agent, wear resistant agent, hardness improvement agent, nucleating agent, transparency improvement agent, brightener, flame retardant, noise•vibration resistant agent, heatproof antioxidant, low density agent, high density agent, blowing agent and the mixtures thereof. If the amount of the additive is less than the above mentioned range, the effect of the additive can not be satisfactory. On the other hand, if the amount of the additive is more than the above mentioned range, the physical properties of polyolefin, such as strength, can be deteriorated.

The long-fiber reinforced polyolefin pellet can be prepared by disentangling long filament fibers from a bundle of filament fibers, and by impregnating, coating, and/or attaching the long filament fibers with modified or normal polyolefin. For example, the long-fiber reinforced polyolefin pellet can be prepared (1) by simply heating filament fibers while adhering the powdered suspension of modified or normal polyolefin to the filament fibers, (2) by impregnating or contacting filament fibers to heat melted polyolefin, (3) by adhering modified or normal polyolefin powder to the charged filament fibers, and then heating the polyolefin powder, or (4) by impregnating filament fibers to a solvent-dissolved modified or normal polyolefin, and then removing the solvent. In the present invention, the impregnation degree of the long-fiber reinforced polyolefin pellet is preferably more than 80%, and more preferably is more than 85%. Preferably, the long-fiber reinforced polyolefin pellet has a length of 6 to 500 mm, and has a diameter of 0.2 to 50 micrometer, and more preferably 3 to 20 micrometer. If the size of the long-fiber reinforced pellet is less than the above-defined range, mechanical properties of the process article can be deteriorated, and if the size of the long-fiber reinforced pellet is more than the above-defined range, the processing of the long-fiber reinforced pellet can be difficult.

The colored polyolefin pellet (B), which is a component of the long-fiber reinforced polyolefin composition according to the present invention, includes 0.01 to 15 weight %, preferably 0.1 to 15 weight % of a coloring agent. The coloring agent can be pigment and/or dye. The amount of the coloring agent is on the basis of the total amount of the coloring agent and polyolefin without additives such as filler, reinforcing agent, or so on. The colored polyolefin pellet (B) has a length of 5 to 500 mm, and preferably 5 to 300 mm. When the amount of the coloring agent is less than 0.01 weight % for the total amount of the coloring agent and polyolefin, the coloring may not be satisfactory, and if the amount of the coloring agent is more than 15 weight %, the mechanical properties of the process article may be deteriorated. When the length of the colored polyolefin pellet less than the above-defined range, the kneading of the colored polyolefin pellets and the long-fiber reinforced pellets may not be sufficiently carried out. When the length of colored polyolefin pellet is more than the above-defined range, the processing of the pellets can be difficult. To eliminate the second cause which deteriorates the properties and quality of the colored polyolefin molded article, the present inventors have controlled the amount of the coloring agent in the colored polyolefin pellet as above mentioned. The amount of the coloring agent of the present invention is not conventional considering that the typical amount of the coloring agent in the colored polyolefin pellet is more than 30 weight %. Preferably, the colored polyolefin pellet useful in the present invention has a similar length with the length of the long-fiber reinforced polyolefin pellet. For example, the length of the colored polyolefin pellet can be 0.4 to 1.6 times, preferably 0.5 to 1.5 times of the length of the long-fiber reinforced polyolefin pellet. If the length of the long-fiber reinforced polyolefin pellet and the length of the colored polyolefin pellet are not within the above-defined ratio, the physical property distributions of the molded article may increase, and the uniformity of the molded article may be deteriorated. Such problem is not found when mixing the colored polyolefin pellet having the length of less than 3 mm and the fiber reinforced polyolefin having the length of less than 3 mm. When the long-fiber reinforced pellet having the length of 6 to 500 mm is used, the long-fiber reinforced pellet can not be uniformly mixed with the colored polyolefin pellet having the length of less than 3 mm, which results in the non-uniform color distribution. The present inventors have found that the difference in the pellet shapes or sizes may induce the serious defects on the final molded article, which can cause more fatal defect in the automobile and electronics parts requiring very uniform quality. Therefore, in the present invention, the colored polyolefin pellet having the length of 5 to 500 mm is mixed with the long-fiber reinforced polyolefin having the length of 5 to 500 mm, which eliminates the defects induced by the pellet shapes or sizes difference.

Polyolefin useful for preparing the colored polyolefin pellet can be selected according to the function and usage of the final molded article, and may include ethylene homopolymer, propylene homopolymer, ethylene-propylene block copolymer, ethylene-propylene random copolymer, propylene α-olefin copolymer, α-olefin homopolymer or copolymer, and the mixtures thereof. The α-olefin can be selected from the group consisting of 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, 1-dodecene, and mixtures thereof, and preferably can be selected from 1-butene, 1-pentene, 1-hexene, and 1-octene. The coloring agent used in the colored polyolefin pellet can include at least one pigment or dye. For example, the coloring agent can be a black coloring agent selected from the group consisting of carbon black, activated carbon, black organic dye, and the mixtures thereof, or can be a white coloring agent selected from the group consisting of Titanium dioxide ($TiO_2$), Zinc oxide (ZnO), Magnesium Oxide (MgO), and the mixtures thereof. In addition, the color of the coloring agent can be any color. For example, the color can be black, gray, white, red, yellow, green, blue, orange, violet, crimson, or can be any natural colors.

The colored polyolefin pellet may also include conventional additive to increase the processability and the functionality of the pellet or to reduce the production cost. The additive for reducing the cost can be a rod or round shaped filler, such as talc, mica, calcium carbonate, glass bead, glass fake, or so on, or a needle shaped filler, such as chopped glass fiber, powdered glass fiber, or so on. The examples of the additive for improving the processability and the functionality of the pellet include dispersant, coating agent for inorganic material, interface binding agent for organic material and inorganic material, cross-linking agent, heat stabilizers, anti-oxidation agent, stabilizer for preventing hydrolysis, various peroxide chemicals, lubricant, interface binding agent, UV-ray stabilizer, light stabilizer, slip agent, release agent, impact resistant agent, wear resistant agent, hardness improvement agent, nucleating agent, transparency improvement agent, brightener, flame retardant, noise•vibration resistant agent, heat-proof antioxidant, low density agent, high density agent, blowing agent and the mixtures thereof.

In the long-fiber reinforced polyolefin composition according to the present invention, the preferable amount of the colored polyolefin pellets is 5 to 80 weight % for the total amount of the colored polyolefin pellets and the long-fiber reinforced polyolefin pellets. By controlling the amount of the colored polyolefin pellet within the above-mentioned range, the deterioration of the physical properties and quality of the molded article can be prevented while keeping the uniformity of the molded article. If the amount of the colored polyolefin pellet is less than 5 weight %, the coloring of the molded article may be imperfect, and the molded article may become physically unstable due to the locally concentrated pigment or dye. The amount of the colored polyolefin pellets is not conventional considering that the typical amount of the colored polyolefin pellet is less than 3 weight %. If the amount of the colored polyolefin pellets is more than 80 weight %, the amount of the long-fiber reinforced polyolefin pellets become too low, and the improvement of the physical properties due to the long-fiber is not satisfactory.

The long-fiber reinforced polyolefin composition of the present invention can be prepared by mixing the colored polyolefin pellets and the long-fiber reinforced polyolefin pellets, so that the amount of the colored polyolefin pellets is 5 to 80 weight % for the total amount of the colored polyolefin pellets and the long-fiber reinforced polyolefin pellets. The long-fiber reinforced polyolefin composition can be processed with a conventional processing method, such as injection molding, extrusion molding, compression molding, compression extrusion molding, low pressure injection molding, gas assisted injection molding, foam injection molding, foam extrusion molding, or so on, to produce the long-fiber reinforced molded article.

In this specification, the impregnation degree means the ratio of the number of long filament fibers coated with polyolefin to the total number of the long filament fibers, and can be represented by the following equation 1.

$$\text{Impregnation degree (\%)} = \text{number of long filament fibers coated with polyolefin/total number of long filament fibers} \times 100 \quad \text{[Equation 1]}$$

An example for calculating the impregnation degree is as follows. More than 3 of the long-fiber reinforced polyolefin pellets are fixed in parallel in a tube having the diameter of a pencil, and then epoxy resin is applied between the pellets to firmly fix the pellets in the tube. After hardening the epoxy resin, the pellets are sliced to have the thickness of 0.5 mm, and then the sliced pellets are investigated with a microscope to count the total number of the long-fiber filament fibers and the number of the polyolefin coated long-fiber filament fibers.

The impregnation degrees for 10 pellets are measured and the measured values are averaged.

Hereinafter, the preferable examples are provided for better understanding of the present invention. However, the present invention is not limited to the following examples.

EXAMPLES AND COMPARATIVE EXAMPLES

1. Preparation of Long-Fiber Reinforced Polyolefin Pellets Containing 30, 40, or 50 Weight % of Glass Fiber Long fiber reinforced polyolefin pellets having the length of 12 mm and containing 30, 40, 50 and 70 weight % of glass fiber, respectively, were produced by using (a) 5 weight % of a modified polypropylene, in which 1 weight % of an acid anhydride was grafted to polypropylene, (b and c) 65/30, 55/40, 45/50 and 25/70 weight % of polypropylene which includes 6 weight % of elastomer (anti-shock agent)/glass fiber filament, (d) 1,000 ppm of IGANOX 1010 (the first antioxidant), (e) 2,000 ppm of IGAFOS 168 (the second antioxidant), (f) 1,000 ppm of a hindered amine compound (the first UV stabilizer), (g) 1000 ppm of a benzophenone (the second UV stabilizer), (h) 300 ppm of a silicone lubricant and (i) 600 ppm of peroxide compound.

2. Preparation of Colored Polyolefin Pellet Having Length of 3, 6, or 12 mm

A. Black colored polyolefin pellets having the length of 3, 6, 12 mm, respectively, were produced by using 57 weight % of polypropylene, 40 weight % of carbon black, 3 weight % of a dispersant, 1000 ppm of the first antioxidant (IGANOX 1010), and 2000 ppm of the second antioxidant (IGAFOS 168).

B. White colored polyolefin pellets having the length of 3, 6, 12 mm, respectively, were obtained by using 57 weight % of polypropylene, 40 weight % of $TiO_2$ or ZnS, 3 weight % of a wax dispersant, 1000 ppm of the first antioxidant (IGANOX 1010), and 2000 ppm of the second antioxidant (IGAFOS 168).

Comparative Examples 1 to 10

The long-fiber reinforced polyolefin pellets (natural color) having the length of 12 mm and containing 30 or 40 weight % of glass fiber and the colored polyolefin pellets (black) having the length of 3 mm and containing 40 weight % of carbon black were mixed with the weight ratio of 99:1 to produce a long-fiber reinforced polyolefin composition containing about 30 or 40 weight % of glass fiber. 5 polyolefin compositions were prepared separately for each composition. Test pieces were manufactured with the polyolefin compositions by injection molding, and tensile strength, flexural strength and Notched Izod impact strength were measured 10 times for each test piece, and the average values were calculated. The measured minimum and maximum values and the property dispersions were also set forth in Table 1, wherein the property dispersion was calculated by (maximum value-minimum value)/average value×100.

TABLE 1

|  | Tensile Strength ($kg/cm^2$) | | Flexural Strength ($kg/cm^2$) | | Impact Strength ($kg/cm^2$) | |
| --- | --- | --- | --- | --- | --- | --- |
|  | Glass fiber content 30% | Glass fiber content 40% | Glass fiber content 30% | Glass fiber content 40% | Glass fiber content 30% | Glass fiber content 40% |
| Comparative Example 1, 2 | 910 | 999 | 1,178 | 1,498 | 8.2 | 23.8 |
| Comparative Example 3, 4 | 815 | 968 | 1,206 | 1,387 | 9.4 | 17.9 |
| Comparative Example 5, 6 | 767 | 920 | 1,256 | 1,460 | 8.0 | 16.5 |
| Comparative Example 7, 8 | 780 | 976 | 1,083 | 1,488 | 10.3 | 17.4 |
| Comparative Example 9, 10 | 756 | 1,050 | 1,043 | 1,603 | 11.5 | 15.9 |
| Average value | 806 | 983 | 1,153 | 1,487 | 9.5 | 18.3 |
| Max/Min | 756/910 | 920/1,050 | 1,043/1,256 | 1,387/1,603 | 8.0/11.5 | 15.9/23.8 |
| Property dispersion (%) | 19.1 | 13.2 | 18.5 | 15 | 36.9 | 43.2 |

In the Table 1, "Glass fiber content 30%" was obtained by mixing the long fiber reinforced polyolefin pellet containing 30 weight % of glass fiber and the black colored polyolefin pellet containing 40 weight % of carbon black with the weight ratio of 99:1, and "Glass fiber content 40%" was obtained by mixing the long fiber reinforced polyolefin pellet containing 40 weight % of glass fiber and the black colored polyolefin pellet containing 40 weight % of carbon black with the weight ratio of 99:1.

Examples 11 to 20

The long-fiber reinforced polyolefin pellets (natural color) having the length of 12 mm and containing 50 weight % of glass fiber and the colored polyolefin pellets (black) having the length of 6 mm and containing 1 or 2 weight % of carbon black were mixed with the weight ratio of 60:40, or with the weight ratio of 80:20 to produce a long-fiber reinforced polyolefin composition containing about 30 or 40 weight % of glass fiber. 5 polyolefin compositions were prepared separately for each composition. Test pieces were manufactured with the polyolefin compositions by injection molding, and tensile strength, flexural strength, Notched Izod impact strength and impregnation degree were measured 10 times for each test piece, and the average values ware calculated. The measured minimum and maximum values and the property dispersions were also set forth in Table 2.

TABLE 2

| | Tensile Strength (kg/cm²) | | Flexural Strength (kg/cm²) | | Impact Strength (kg/cm²) | | impregnation degree |
|---|---|---|---|---|---|---|---|
| | Glass fiber content 30% | Glass fiber content 40% | Glass fiber content 30% | Glass fiber content 40% | Glass fiber content 30% | Glass fiber content 40% | Glass fiber content 40% |
| Example 11, 12 | 924 | 1,152 | 1186 | 1635 | 15.7 | 26.5 | 95.7 |
| Example 13, 14 | 907 | 1,047 | 1245 | 1515 | 16.7 | 27.9 | 96.3 |
| Example 15, 16 | 964 | 1,143 | 1262 | 1586 | 19.1 | 30.2 | 96.1 |
| Example 17, 18 | 983 | 1,117 | 1275 | 1538 | 17.1 | 31.2 | 97.3 |
| Example 19, 20 | 952 | 1,067 | 1286 | 1667 | 19.1 | 29.9 | 90.5 |
| Average value | 946 | 1,105 | 1251 | 1588 | 17.1 | 29.1 | — |
| Max/Min | 907/983 | 1,047/1,143 | 1186/1286 | 1515/1667 | 15.7/19.1 | 26.5/31.5 | — |
| Property dispersion (%) | 8 | 8.7 | 8 | 9.6 | 19.4 | 16.2 | — |

In the Table 2, "Glass fiber content 30%" was obtained by mixing the long fiber reinforced polyolefin pellet containing 50 weight % of glass fiber and the black colored polyolefin pellet containing 1 weight % of carbon black with the weight ratio of 60:40, and "Glass fiber content 40%" was obtained by mixing the long fiber reinforced polyolefin pellet containing 50 weight % of glass fiber and the black colored polyolefin pellet containing 2 weight % of carbon black with the weight ratio of 80:20.

Examples 21 to 30

The long-fiber reinforced polyolefin pellets (natural color) having the length of 12 mm and containing 50 weight % of glass fiber and the colored polyolefin pellets (black) having the length of 12 mm and containing 1 or 2 weight % of carbon black were mixed with the weight ratio of 60:40, or with the weight ratio of 80:20 to produce a long-fiber reinforced polyolefin composition containing about 30 or 40 weight % of glass fiber. 5 polyolefin compositions were prepared separately for each composition. Test pieces were manufactured with the polyolefin compositions by injection molding, and tensile strength, flexural strength, Notched Izod impact strength and impregnation degree were measured 10 times for each test piece, and the average values were calculated. The measured minimum and maximum values and the property dispersions were also set forth in Table 3.

In the Table 3, "Glass fiber content 30%" was obtained by mixing the long fiber reinforced polyolefin pellet containing 50 weight % of glass fiber and the black colored polyolefin pellet containing 1 weight % of carbon black with the weight ratio of 60:40, and "Glass fiber content 40%" was obtained by mixing the long fiber reinforced polyolefin pellet containing 50 weight % of glass fiber and the black colored polyolefin pellet containing 2 weight % of carbon black with the weight ratio of 80:20.

Comparative Examples 31 to 40

The long-fiber reinforced polyolefin pellets (natural color) having the length of 12 mm and containing 32 or 42 weight % of glass fiber and the colored polyolefin pellets (white) having the length of 3 mm and containing 40 weight % of TiO₂ were mixed with the weight ratio of 97:3 to produce a long-fiber reinforced polyolefin composition containing about 30 or 40 weight % of glass fiber. 5 polyolefin compositions were prepared separately for each composition. Test pieces were manufactured with the polyolefin compositions by injection molding, and tensile strength, flexural strength and Notched Izod impact strength were measured 10 times for each test piece, and the average values were calculated. The measured minimum and maximum values and the property dispersions were also set forth in Table 4.

TABLE 3

| | Tensile Strength (kg/cm²) | | Flexural Strength (kg/cm²) | | Impact Strength (kg/cm²) | | impregnation degree |
|---|---|---|---|---|---|---|---|
| | Glass fiber content 30% | Glass fiber content 40% | Glass fiber content 30% | Glass fiber content 40% | Glass fiber content 30% | Glass fiber content 40% | Glass fiber content 40% |
| Example 21, 22 | 1,041 | 1,180 | 1,483 | 1,751 | 21.4 | 33.1 | 97.1 |
| Example 23, 24 | 1,023 | 1,195 | 1,467 | 1,753 | 21.4 | 34.0 | 93.5 |
| Example 25, 26 | 1,018 | 1,241 | 1,465 | 1,732 | 21.4 | 36.0 | 96.4 |
| Example 27, 28 | 1,012 | 1,243 | 1,483 | 1,825 | 24.0 | 34.0 | 92.7 |
| Example 29, 30 | 1,010 | 1,200 | 1,523 | 1,731 | 23.7 | 33.1 | 98.9 |
| Average value | 1,021 | 1,212 | 1,484 | 1,758 | 22.4 | 34.0 | — |
| Max/Min | 1,012/1,041 | 1,180/1,241 | 1,465/1,523 | 1,731/1,825 | 21.4/24.0 | 33.1/36.0 | — |
| Property dispersion (%) | 2.8 | 5.0 | 3.9 | 5.3 | 11.6 | 8.5 | — |

TABLE 4

| | Tensile Strength (kg/cm²) | | Flexural Strength (kg/cm²) | | Impact Strength (kg/cm²) | |
|---|---|---|---|---|---|---|
| | Glass fiber content 30% | Glass fiber content 40% | Glass fiber content 30% | Glass fiber content 40% | Glass fiber content 30% | Glass fiber content 40% |
| Comparative Example 31, 32 | 873 | 1,106 | 1,081 | 1,564 | 8.1 | 17.2 |
| Comparative Example 33, 34 | 895 | 1,049 | 1,083 | 1,535 | 8.5 | 24.1 |
| Comparative Example 35, 36 | 892 | 1,084 | 1,174 | 1,584 | 7.5 | 18.6 |
| Comparative Example 37, 38 | 901 | 1,143 | 1,066 | 1,598 | 9.5 | 24.4 |
| Comparative Example 39, 40 | 815 | 1,130 | 1,128 | 1,483 | 10.5 | 20.6 |
| Average value | 875 | 1,102 | 1,106 | 1,553 | 8.8 | 21.0 |
| Max/Min | 815/901 | 1,049/1,143 | 1,066/1,174 | 1,483/1,598 | 7.5/10.5 | 17.2/24.4 |
| Property dispersion (%) | 9.8 | 8.5 | 9.8 | 7.4 | 34.1 | 34.3 |

In the Table 4, "Glass fiber content 30%" was obtained by mixing the long fiber reinforced polyolefin pellet containing 32 weight % of glass fiber and the white colored polyolefin pellet containing 40 weight % of TiO$_2$ with the weight ratio of 97:3, and "Glass fiber content 40%" was obtained by mixing the long fiber reinforced polyolefin pellet containing 42 weight % of glass fiber and the white colored polyolefin pellet containing 40 weight % of TiO$_2$ with the weight ratio of 97:3.

Examples 41 to 50

The long-fiber reinforced polyolefin pellets (natural color) having the length of 12 mm and containing 50 weight % of glass fiber and the colored polyolefin pellets (white) having the length of 6 mm and containing 1 or 2 weight % of ZnS were mixed with the weight ratio of 60:40, or with the weight ratio of 80:20 to produce a long-fiber reinforced polyolefin composition containing about 30 or 40 weight % of glass fiber. 5 polyolefin compositions were prepared separately for each composition. Test pieces were manufactured with the polyolefin compositions by injection molding, and tensile strength, flexural strength, Notched Izod impact strength and impregnation degree were measured 10 times for each test piece, and the average values were calculated. The measured minimum and maximum values and the property dispersions were also set forth in Table 5.

In the Table 5, "Glass fiber content 30%" was obtained by mixing the long fiber reinforced polyolefin pellet containing 50 weight % of glass fiber and the white colored polyolefin pellet containing 1 weight % of ZnS with the weight ratio of 60:40, and "Glass fiber content 40%" was obtained by mixing the long fiber reinforced polyolefin pellet containing 50 weight % of glass fiber and the white colored polyolefin pellet containing 2 weight % of ZnS with the weight ratio of 80:20.

Examples 51 to 60

The long-fiber reinforced polyolefin pellets (natural color) having the length of 12 mm and containing 50 weight % of glass fiber and the colored polyolefin pellets (white) having the length of 12 mm and containing 1 or 2 weight % of ZnS were mixed with the weight ratio of 60:40, or with the weight ratio of 80:20 to produce a long-fiber reinforced polyolefin composition containing about 30 or 40 weight % of glass fiber. 5 polyolefin compositions were prepared separately for each composition. Test pieces were manufactured with the polyolefin compositions by injection molding, and tensile strength, flexural strength, Notched Izod impact strength and impregnation degree were measured 10 times for each test piece, and the average values were calculated. The measured minimum and maximum values and the property dispersions were also set forth in Table 6.

TABLE 5

| | Tensile Strength (kg/cm²) | | Flexural Strength (kg/cm²) | | Impact Strength (kg/cm²) | | impregnation degree |
|---|---|---|---|---|---|---|---|
| | Glass fiber content 30% | Glass fiber content 40% | Glass fiber content 30% | Glass fiber content 40% | Glass fiber content 30% | Glass fiber content 40% | Glass fiber content 40% |
| Example 41, 42 | 993 | 1,211 | 1,389 | 1,688 | 12.2 | 21.4 | 95.3 |
| Example 43, 44 | 945 | 1,145 | 1,455 | 1,681 | 12.0 | 20.2 | 93.7 |
| Example 45, 46 | 991 | 1,223 | 1,386 | 1,783 | 10.9 | 24.3 | 95.7 |
| Example 47, 48 | 1,013 | 1,236 | 1,415 | 1,725 | 11.4 | 21.7 | 96.1 |
| Example 49, 50 | 928 | 1,163 | 1,436 | 1,714 | 11.9 | 22.3 | 97.2 |
| Average value | 974 | 1,196 | 1,416 | 1,718 | 11.7 | 22.5 | — |
| Max/Min | 928/1,013 | 1,145/1,236 | 1,386/1,455 | 1,681/1,783 | 10.9/12.2 | 20.2/24.3 | — |
| Property dispersion (%) | 8.7 | 7.6 | 4.9 | 5.9 | 11.1 | 18.2 | — |

TABLE 6

| | Tensile Strength (kg/cm$^2$) | | Flexural Strength (kg/cm$^2$) | | Impact Strength (kg/cm$^2$) | | impregnation degree |
|---|---|---|---|---|---|---|---|
| | Glass fiber content 30% | Glass fiber content 40% | Glass fiber content 30% | Glass fiber content 40% | Glass fiber content 30% | Glass fiber content 40% | Glass fiber content 40% |
| Example 51, 52 | 1,023 | 1,329 | 1,527 | 1,823 | 18.3 | 25.1 | 95.0 |
| Example 53, 54 | 1,038 | 1,304 | 1,524 | 1,907 | 18.1 | 24.1 | 95.3 |
| Example 55, 56 | 1,046 | 1,236 | 1,486 | 1,830 | 19.3 | 23.6 | 94.7 |
| Example 57, 58 | 1,047 | 1,306 | 1,522 | 1,886 | 18.5 | 23.5 | 96.2 |
| Example 59, 60 | 1,027 | 1,319 | 1,493 | 1,906 | 18.7 | 23.9 | 93.7 |
| Average value | 1,036 | 1,299 | 1,510 | 1,881 | 18.6 | 24.0 | — |
| Max/Min | 1,023/1,047 | 1,236/1,329 | 1,486/1,527 | 1,823/1,907 | 18.1/19.3 | 23.5/25.1 | — |
| Property dispersion (%) | 2.3 | 7.2 | 2.7 | 4.5 | 6.5 | 6.6 | — |

In the Table 6, "Glass fiber content 30%" was obtained by mixing the long fiber reinforced polyolefin pellet containing 50 weight % of glass fiber and the white colored polyolefin pellet containing 1 weight % of ZnS with the weight ratio of 60:40, and "Glass fiber content 40%" was obtained by mixing the long fiber reinforced polyolefin pellet containing 50 weight % of glass fiber and the white colored polyolefin pellet containing 2 weight % of ZnS with the weight ratio of 80:20.

Comparative Examples 61 to 65

The long-fiber reinforced polyolefin pellets (natural color) having the length of 12 mm and containing 32 weight % of glass fiber and the colored polyolefin pellets (gray) having the length of 3 mm and containing 40 weight % of TiO$_2$/Carbon black mixture were mixed with the weight ratio of 97:3 to produce along-fiber reinforced polyolefin composition containing about 30 weight % of glass fiber. 5 polyolefin compositions were prepared separately. Test pieces were manufactured with the polyolefin compositions by injection molding, and tensile strength, flexural strength and Notched Izod impact strength were measured 10 times for each test piece, and the average values were calculated. The measured minimum and maximum values and the property dispersions were also set forth in Table 7.

TABLE 7

| | Tensile Strength (kg/cm$^2$) | Flexural Strength (kg/cm$^2$) | Impact Strength (kg/cm$^2$) |
|---|---|---|---|
| Comparative Example 61 | 801 | 987 | 7.6 |
| Comparative Example 62 | 824 | 1044 | 8.0 |
| Comparative Example 63 | 838 | 1048 | 8.2 |
| Comparative Example 64 | 849 | 1082 | 8.5 |
| Comparative Example 65 | 849 | 1133 | 9.5 |
| Average value | 832 | 1059 | 8.4 |
| Max/Min | 801/849 | 987/1,133 | 7.6/9.5 |
| Property dispersion (%) | 5.8 | 13.8 | 22.6 |

Comparative Examples 66 to 70

The long-fiber reinforced polyolefin pellets (natural color) having the length of 12 mm and containing 50 weight % of glass fiber and the colored polyolefin pellets (gray) having the length of 12 mm and containing 1 weight % of ZnS/Carbon black mixture were mixed with the weight ratio of 60:40 to produce a long-fiber reinforced polyolefin composition containing about 30 weight % of glass fiber. 5 polyolefin compositions were prepared separately. Test pieces were manufactured with the polyolefin compositions by injection molding, and tensile strength, flexural strength, Notched Izod impact strength and impregnation degree were measured 10 times for each test piece, and the average values were calculated. The measured minimum and maximum values and the property dispersions were also set forth in Table 8.

TABLE 8

| | Tensile Strength (kg/cm$^2$) | Flexural Strength (kg/cm$^2$) | Impact Strength (kg/cm$^2$) | impregnation degree |
|---|---|---|---|---|
| Example 66 | 999 | 1,380 | 16.3 | 97.1 |
| Example 67 | 1,005 | 1,329 | 17.3 | 98.5 |
| Example 68 | 1,010 | 1,362 | 17.6 | 99.2 |
| Example 69 | 1,008 | 1,382 | 17.5 | 96.7 |
| Example 70 | 1,018 | 1,369 | 17.3 | 95.7 |
| Average value | 1008 | 1,364 | 17.2 | — |
| Max/Min | 999/1,018 | 1,329/1,382 | 16.3/17.6 | — |
| Property dispersion (%) | 1.9 | 3.9 | 7.6 | — |

As shown in Tables 1 to 8, the molded article obtained by processing the long-fiber reinforced polyolefin composition according to the present invention have good mechanical strengths such as tensile strength, flexural strength, and impact strength.

Example 71 and Comparative Example 72

The long-fiber reinforced polyolefin pellets (natural color) having the length of 12 mm, containing 70 weight % of glass fiber and having the impregnation degree of 94.6% or 73.0%, and the colored polyolefin pellets (gray) having the length of 10 mm and containing 0.7 weight % of ZnS/Carbon black mixture were mixed with the weight ratio of 42.9:57.1 to produce a long-fiber reinforced polyolefin composition containing about 30 weight % of glass fiber. 5 polyolefin compositions were prepared separately. Test pieces were manufactured with the polyolefin compositions by injection molding, and tensile strength, flexural strength, and Notched Izod impact strength were measured 10 times for each test piece, and the average values were calculated, and were set forth in Table 9.

TABLE 9

| | Tensile Strength (kg/cm$^2$) | Flexural Strength (kg/cm$^2$) | Impact Strength (kg/cm$^2$) | impregnation degree |
|---|---|---|---|---|
| Example 71 | 1,001 | 1,351 | 18.5 | 94.6 |
| Comparative example 72 | 815 | 1,153 | 11.5 | 73.0 |

As described above, the colored and long-fiber reinforced molded article of the present invention has superior mechanical properties, such as tensile strength, flexural strength, and impact strength, and good heat resistance. Therefore, the colored article can be produced without losing the physical properties. Also, while the conventional colored article, which includes pigment or dye, suffers the deterioration of physical properties and the production cost thereof is expensive, but the colored article of the present invention have sufficient coloring property and remarkably uniform physical properties.

The invention claimed is:

1. A long-fiber reinforced polyolefin composition, comprising: long-fiber reinforced polyolefin pellets including 35 to 90 weight % of a long-fiber reinforcing agent and 5 to 60 weight % of a polyolefin, wherein an impregnation degree of the long-fiber reinforced polyolefin pellets is more than 80%; and colored polyolefin pellets having a length of 5 to 500 mm, and including 0.01 to 15 weight % of a coloring agent based on the total amount of the coloring agent and polyolefin, wherein an amount of the colored polyolefin pellets is 5 to 80 weight % based on a total amount of the colored polyolefin pellets and the long-fiber reinforced polyolefin pellets, and the long-fiber reinforced polyolefin pellets and the colored polyolefin pellets exist in a weight ratio of 20:80 to 60:40 in the composition.

2. The long-fiber reinforced polyolefin composition according to claim 1, wherein the long-fiber reinforced polyolefin pellets have a length of 6 to 500 mm.

3. The long-fiber reinforced polyolefin composition according to claim 1, wherein the coloring agent is black coloring agent selected from the group consisting of carbon black, activated carbon, black organic dye, and mixtures thereof.

4. The long-fiber reinforced polyolefin composition according to claim 1, wherein the coloring agent is a white coloring agent selected from the group consisting of Titanium dioxide (TiO$_2$), Zinc oxide (ZnO), Magnesium Oxide (MgO), and mixtures thereof.

5. The long-fiber reinforced polyolefin composition according to claim 1, wherein the coloring agent is selected from the group consisting of a gray coloring agent, red coloring agent, yellow coloring agent, green coloring agent, blue coloring agent, orange coloring agent, violet coloring agent, crimson coloring agent, and mixtures thereof.

6. The long-fiber reinforced polyolefin composition according to claim 1, wherein the polyolefin is selected from the group consisting of ethylene homopolymer, propylene homopolymer, ethylene-propylene block copolymer, ethylene-propylene random copolymer, propylene α-olefin copolymer, α-olefin homopolymer or copolymer, and mixtures thereof.

7. The long-fiber reinforced polyolefin composition according to claim 1, wherein the long-fiber reinforcing agent has a length of 6 to 500 mm, and is selected from the group consisting of glass filament fiber, carbon filament fiber, graphite filament fiber, metal filament fiber, aramid fiber filament, polyethylene filament fiber, polyacrylonitrile filament fiber, arylate filament fiber, polyether ether ketone filament fiber, and mixtures thereof.

8. The long-fiber reinforced polyolefin composition according to claim 1, wherein the length of the colored polyolefin pellet is 0.4 to 1.6 times the length of the long-fiber reinforced polyolefin pellet.

9. A method for producing a long-fiber reinforced polyolefin molded article, comprising the steps of:

mixing long-fiber reinforced polyolefin pellets and colored polyolefin pellets in a ratio of 20:80 to 60:40, wherein the long-fiber reinforced polyolefin pellets include 35 to 90 weight % of a long-fiber reinforcing agent and 5 to 60 weight % of a polyolefin, the colored polyolefin pellets have a length of 5 to 500 mm, the colored polyolefin pellets include 0.01 to 15 weight % of a coloring agent based on the total amount of the coloring agent and polyolefin, and an amount of the colored polyolefin pellets is 5 to 80 weight % based on a total amount of the colored polyolefin pellets and the long-fiber reinforced polyolefin pellets; and molding the mixed pellets.

10. The method for producing a long-fiber reinforced polyolefin molded article according to claim 9, wherein the molding step is carried out by a method selected from the group consisting of injection molding, extrusion molding, compression molding, compression extrusion molding, low pressure injection molding, gas assisted injection molding, foam injection molding, and foam extrusion molding.

11. A long-fiber reinforced molded article which is produced by the method of claim 9.

* * * * *